United States Patent [19]
Taoda

[11] Patent Number: 5,724,552
[45] Date of Patent: Mar. 3, 1998

[54] DISK ARRAY MANAGEMENT UNIT FOR DISTRIBUTIVELY RECORDING DATA IN A PLURALITY OF DISKS DEPENDING ON THE DATA ACCESS FREQUENCY

[75] Inventor: Masami Taoda, Yokohama, Japan

[73] Assignee: Kabushiki Kaisha Toshiba, Kawasaki, Japan

[21] Appl. No.: 275,671

[22] Filed: Jul. 15, 1994

[30] Foreign Application Priority Data

Jul. 16, 1993 [JP] Japan .................................. 5-176965

[51] Int. Cl.$^6$ .................................. G06F 12/02
[52] U.S. Cl. .................... 395/492; 395/621; 395/441
[58] Field of Search .................. 395/441, 182.04, 395/439, 460, 438, 492, 404, 405, 456, 458, 475, 482, 613, 614, 621; 360/24

[56] References Cited

U.S. PATENT DOCUMENTS 5,459,853  10/1995  Best et al. ............................ 395/441
5,463,765  10/1995  Kakuta et al. ..................... 395/182.04

OTHER PUBLICATIONS

Nikkei Computer (Mar. 9, 1992), pp. 86–99.

Patterson, et al: "A Case for Redundant Arrays of Inexpensible Disks (RAID): ACM: Association for Computing Machinery"., pp. 109–116, –1988.

*Primary Examiner*—Eddie P. Chan
*Assistant Examiner*—Hiep T. Nguyen
*Attorney, Agent, or Firm*—Cushman, Darby & Cushman IP Group of Pillsbury Madison & Sutro LLP

[57] ABSTRACT

A disk array apparatus employs portable optical disk. The apparatus determines whether a file should be concentrated recorded in a single optical disk or distributively recorded among a plurality of disks, in accordance with the amount of that file. With respect to an often-accessed file, the apparatus records it among a number of optical disks, or makes a duplicate copy of the file and stores the duplicate copy in an optical disk different from the optical disk containing the often-accessed file. Since the often-accessed file is handled in this manner, the apparatus enables efficient file management and permits a file to be accessed at high speed.

8 Claims, 11 Drawing Sheets

|   | 1 | 2 | 3 | 4 | 5 |   |
|---|---|---|---|---|---|---|
|   |   |   |   |   |   |   |
|   |   |   |   |   |   |   |
|   |   |   |   |   |   |   |
|   |   |   |   |   |   |   |
|   | TEXT 1-1 | TEXT 1-2 | TEXT 1-3 | TEXT 1-4 | PARITY DATA |   |
|   | TEXT 2-3 | TEXT 2-2 |   |   | PARITY DATA |   |
|   | FILE 1-1 | FILE 1-2 | FILE 1-3 | FILE 1-4 | PARITY DATA |   |
|   | FILE 1-5 | FILE 1-6 | FILE 1-7 | FILE 1-8 | PARITY DATA | GROUP 1 |
|   |   |   |   |   |   |   |
|   |   |   |   |   |   |   |
|   |   |   |   |   |   |   |
|   | TEXT 3-1 | TEXT 3-2 | TEXT 3-3 | TEXT 3-4 | PARITY DATA |   |
|   |   |   |   |   |   |   |
|   |   |   |   |   |   | GROUP 2 |

FIG. 2
(PRIOR ART)

OPTICAL DISK DRIVE-MANAGEMENT TABLE 13a

| DRIVE NUMBER | MEDIUM GROUP NUMBER | MEDIUM NUMBER |
|---|---|---|
| 1 | 1 | 1 |
| 2 | 1 | 2 |
| 3 | 1 | 3 |
| 4 | 1 | 4 |
| 5 | 1 | 5 |

FIG. 4

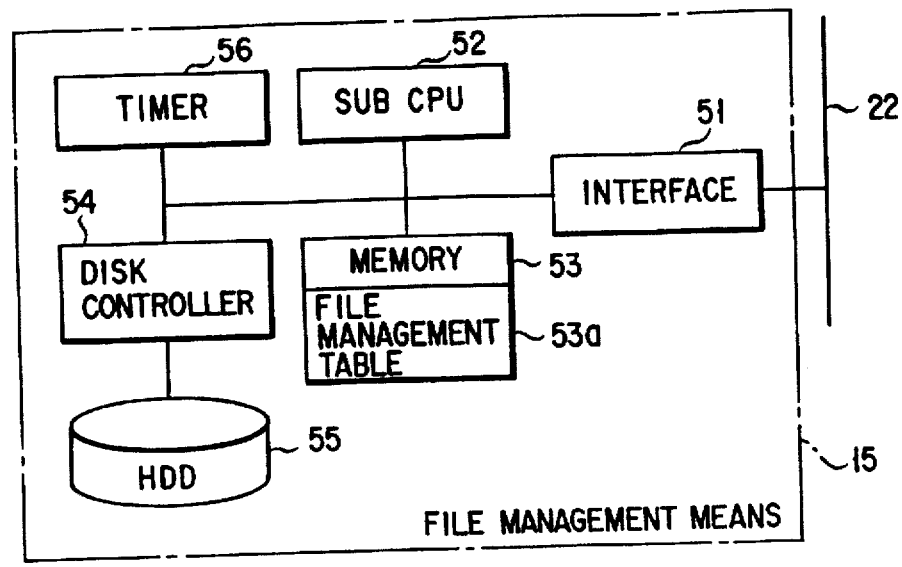
F I G. 6
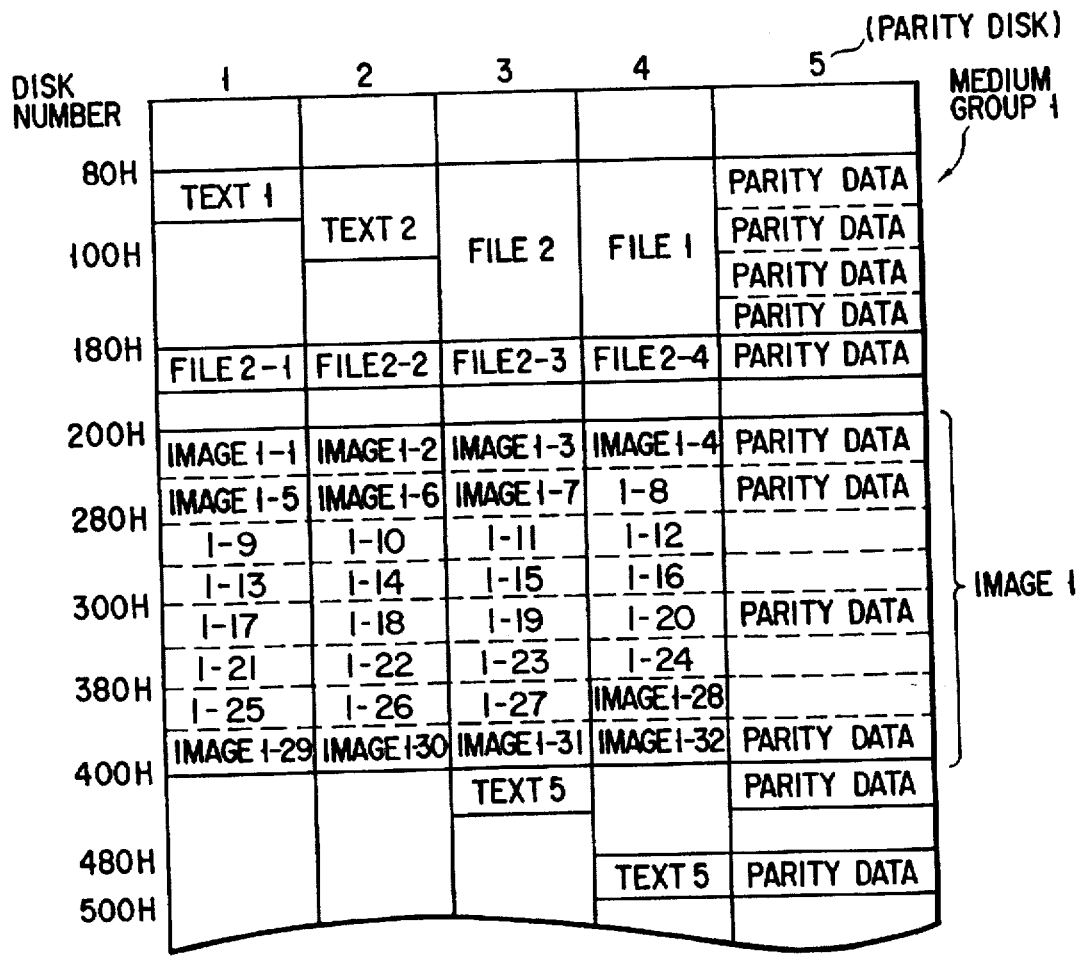
F I G. 8

| FILE NUMBER | FILE NAME | FILE SIZE | MEDIUM GROUP | MEDIUM NUMBER | INITIAL BLOCK ADDRESS | COPY INFORMATION | NEXT INFORMATION | ACCESS FREQUENCY |
|---|---|---|---|---|---|---|---|---|
| 1 | TEXT 1 | 64KB | 1 | 1 | 80H | -1 | -1 | 1 |
| 2 | TEXT 2 | 128KB | 1 | 2 | 80H | -1 | -1 | 5 |
| 3 | IMAGE 1 | 2MB | 1 | -1 | 200H | -1 | -1 | 2 |
| 4 | IMAGE 2 | 512KB | 2 | 1 | 300H | -1 | 5 | 1 |
| 5 | IMAGE 2 | 512KB | 2 | 1 | 800H | -1 | -1 | 1 |
| 6 | TEXT 5 | 64KB | 1 | 3 | 400H | 7 | -1 | 20 |
| 7 | TEXT 5 | 64KB | 1 | 4 | 480H | -1 | -1 | 0 |
| 8 | IMAGE 3 | 1MB | 1 | -1 | 500H | -1 | -1 | 9 |
| 9 | FILE 1 | 256KB | 1 | 4 | 80H | -1 | -1 | 1 |
| 10 | FILE 2 | 256KB | 1 | 3 | 80H | -1 | -1 | 30 |
| 11 | FILE 2 | 256KB | 1 | -1 | 180H | -1 | -1 | 0 |

53a

F I G. 7

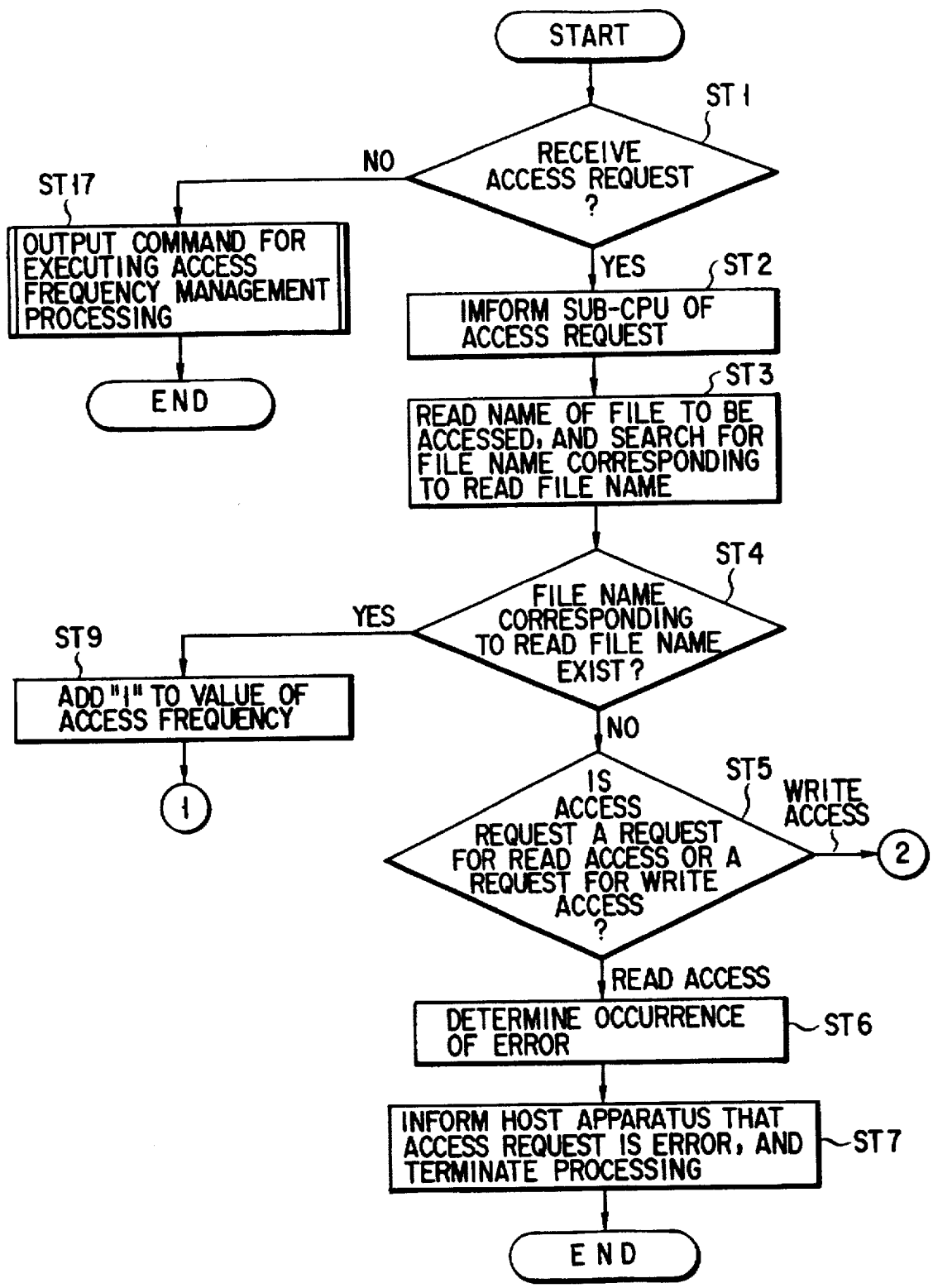
F I G. 12A

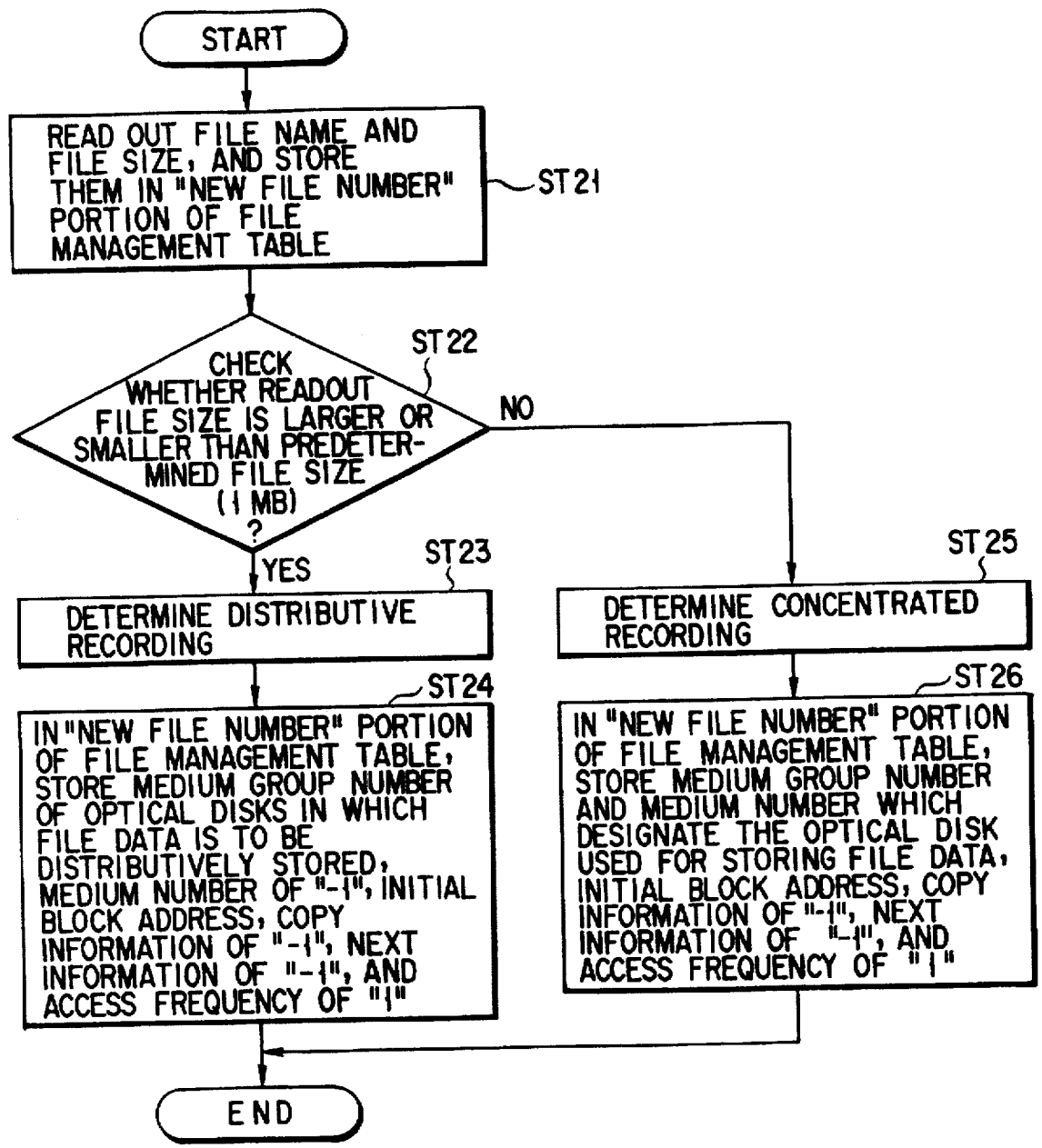
F I G. 13

DISK ARRAY MANAGEMENT UNIT FOR DISTRIBUTIVELY RECORDING DATA IN A PLURALITY OF DISKS DEPENDING ON THE DATA ACCESS FREQUENCY

BACKGROUND OF THE INVENTION

1. Field of the Invention

The present invention relates to a disk array apparatus which is incorporated in a RAID (Redundant Array of Inexpensive Disks) employing optical disks as portable media and which can access a plurality of optical disks in parallel at high speed and manage the files recorded in the disks with high efficiency.

2. Description of the Related Art

In recent years, a data array apparatus has been commercialized as an apparatus which ensures high-speed data transfer and which hardly breaks down. A disk array apparatus employing a hard disk drive is known as a fixed memory apparatus which is called a RAID (Redundant Arrays of Inexpensive Disks) system (refer to 1988 ACM Association For Computing Machinery).

In this type of disk array apparatus, data is distributively recorded in a plurality of hard disks, except in the hard disks in the form of mirrors, in units of one bit or one byte (RAID2, RAID3) or in units of one sector (RAID4, RAID5), so that data can be written or read by the hard disk drives in parallel.

The disk array apparatus enables a number of hard disks to be accessed in parallel, so that a high-speed operation is ensured. In addition, the disk array apparatus comprises a hard disk for storing redundant data, and data can be generated even if one of the hard disk drives breaks down. Therefore, the disk array apparatus is improved in reliability.

The conventional art will be described with reference to FIG. 1.

FIG. 1 is a block diagram of a conventional disk array apparatus employing hard disk drives. The disk array apparatus comprises: a host interface section 1 for performing interface control with reference to a host computer; CPU 2 for controlling the entire disk array apparatus; a memory 3 for temporarily storing the program codes or data of CPU 2, the communication data exchanged with reference to the host apparatus, and the data to be stored in a hard disk; file management means 5 for managing the files stored in the disk array apparatus; data transfer means 4 for transferring data between the storage medium and the memory 3 and between the memory 3 and the host computer; disk controllers 6a, 6b, 6c, 6d, and 6e for controlling the hard disk drives; and ten hard disk drives 7a, 7b, 7c, 7d, and 7e.

Of the ten hard disk drives 7a, 7b, 7c, 7d, 7e, 8a, 8b, 8c, 8d, and 8e, those denoted by 7a, 7b, 7c, 7d, and 7e constitute Group 1 and those denoted by 8a, 8b, 8c, 8d, and 8e constitute Group 2.

Two of the hard disk drives are connected to each of the disk controllers 6a, 6b, 6c, 6d, and 6e, respectively. All hard disk drives can be accessed without changing the connections among them, by selectively designating the hard disk drives.

The conventional art shown in FIG. 2 is a RAID4 mode, and parity data is stored in the hard disk drives 7e and 8e that are connected to disk controller 6e, and ordinary data is stored in the other hard disks in a distributed manner. Let it be assumed that data is stored in a distributed manner in units of 16 KB in the conventional art shown in FIG. 2. In this case, file "Text1" having a size of 64 KB is stored in a distributed manner such that the first 16 KB data is stored in hard disk drive 7a, the next 16 KB data is stored in hard disk drive 7b at an area of the same address, the next 16 KB data is stored in hard disk drive 7c at an area of the same address, and the last 16 KB data is stored in hard disk drive 7d at an area of the same address.

Let it be assumed that an access request for file "Text1" stored in the hard disk drives of Group 1 and an access request for file "Text3" stored in the hard disk drives of Group 2 are made simultaneously. In this case, the two files "Text1" and "Text3" cannot be accessed simultaneously since the hard disks of Group 1 in which file "Text1" is stored and the hard disks of Group 2 in which file "Text3" is stored are connected to the same disk controllers 6a, 6b, 6c, and 6d. File "Text3" is accessed immediately after file "Text1" is accessed.

The hard disks 8a, 8b, 8c, and 8d in which file "Text3" is stored and the hard disks 7a, 7b, 7c, and 7d in which file "Text3" is stored are different, but these files can be accessed by selectively designating the hard disks in which they are stored, and the connections among the hard disks need not be changed at the time of access.

Where optical disks are employed as portable media, however, files stored in hard disks of different groups cannot be accessed by merely designating the hard disks, and all optical disks have to be replaced, resulting in a long operation time.

In a parallel system which is not a RAID system employing optical disks, no consideration is given to a library function which makes use of the merits of portable media, and data is recorded in a distributed manner only.

In disk array apparatuses, including the conventional art mentioned above, a number of optical disks are recorded in a distributed manner in units of one bit or one byte (RAID2, RAID3) or in units of one sector (RAID4, RAID5), and data is written or read by the hard disk drives in parallel. All data are distributively stored in the optical disks and are grouped in units of a certain number of optical disks. In a disk array apparatus employing portable optical disks, therefore, the grouped optical disks must be loaded in the respective optical disk drives. If the optical disks must be replaced with others, a very long time is required for accessing a target file stored in the optical disks.

SUMMARY OF THE INVENTION

Accordingly, an object of the present invention is to provide a disk array apparatus which employs portable optical disks and which, for the purpose of ensuring high-speed access, determines whether one file should be concentratedly stored in a single optical disk or distributively stored in a number of optical disks in accordance with the amount of that file or with the frequency at which the file is to be accessed.

To achieve the above object, the present invention provides a disk array apparatus comprising:

a plurality of disk drives each for recording data on a disk;

management means for preparing a media group including a plurality of disks;

means for supplying data to be recorded on the disks by the disk drives;

detection means for detecting the amount of data supplied by the supplying means;

first control means for controlling one of the disk drives to record all of the data supplied by the supplying means in a single disk, when the detection means detects that the amount of data input by the input means is smaller than a predetermined amount; and second control means for controlling the disk drives to distributively record the data supplied by the supplying means in at least two of the disks constituting the media group prepared by the management means, when the detection means detects that the amount of data supplied by the supplying means exceeds the predetermined amount.

The present invention also provides a disk array apparatus, comprising:

a plurality of disk drives each for executing data access to a disk;

count means for counting the number of times of the data access with respect to each of the disk drives, the count means operating when the data access is performed by executed any of the disk drives; and control means, for recording same data on at least two of disks by means of at when the number of times of the data access counted by the count means exceeds a predetermined number.

The present invention further provides a disk array apparatus, comprising:

a plurality of disk drives each for executing data access to a disk;

management means for preparing a media group including a plurality of disks which are assigned in correspondence to the disk drives;

count means for counting the number of times of the data access with respect to each of the disk drives, the count means operating when the data access is executed by any to the disk drives; and control means, for distributively recording the data on at least two of disks by means of at least two of the disk drives when the number of times of the data access counted by the counting means exceeds a predetermined number.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 shows how files are stored in the hard disks of the conventional disk array apparatus;

FIG. 4 shows a manner in which an optical disk drive-management table is stored;

FIG. 6 is a block diagram showing the internal structure of a file management means;

FIG. 7 is a view showing a manner in which a file management table is stored;

FIG. 8 shows how files are stored in optical disks;

FIG. 12A and 12B are a flowchart showing how the operations are executed according to the present invention;

FIG. 13 is a flowchart showing how individual operations are performed; and

DETAILED DESCRIPTION OF THE PREFERRED EMBODIMENTS

One embodiment of the present invention will now be described with reference to the accompanying drawings.

Figure 1:
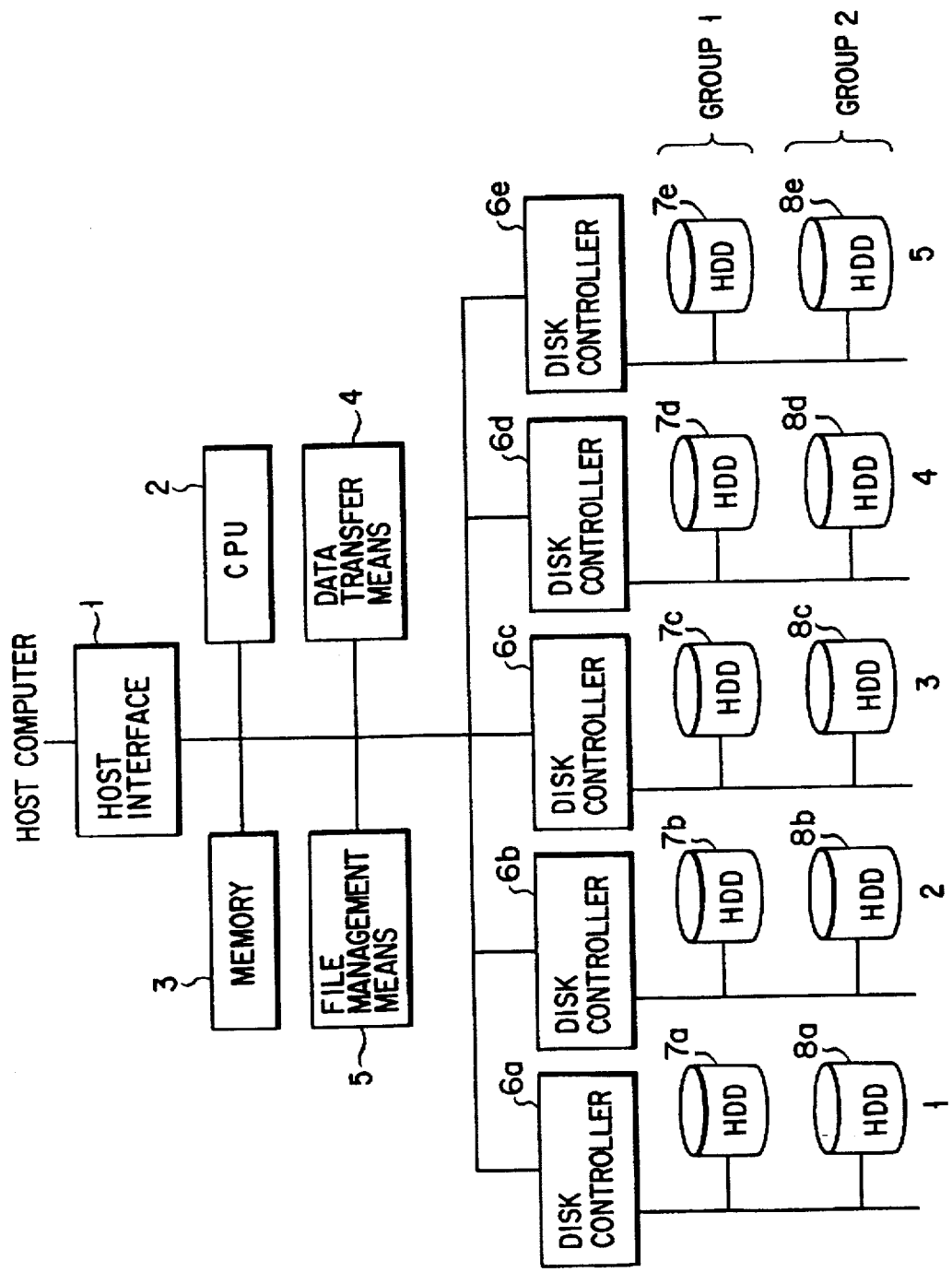
FIG. 1 is a block diagram showing a conventional disk array apparatus.
Figure 3:
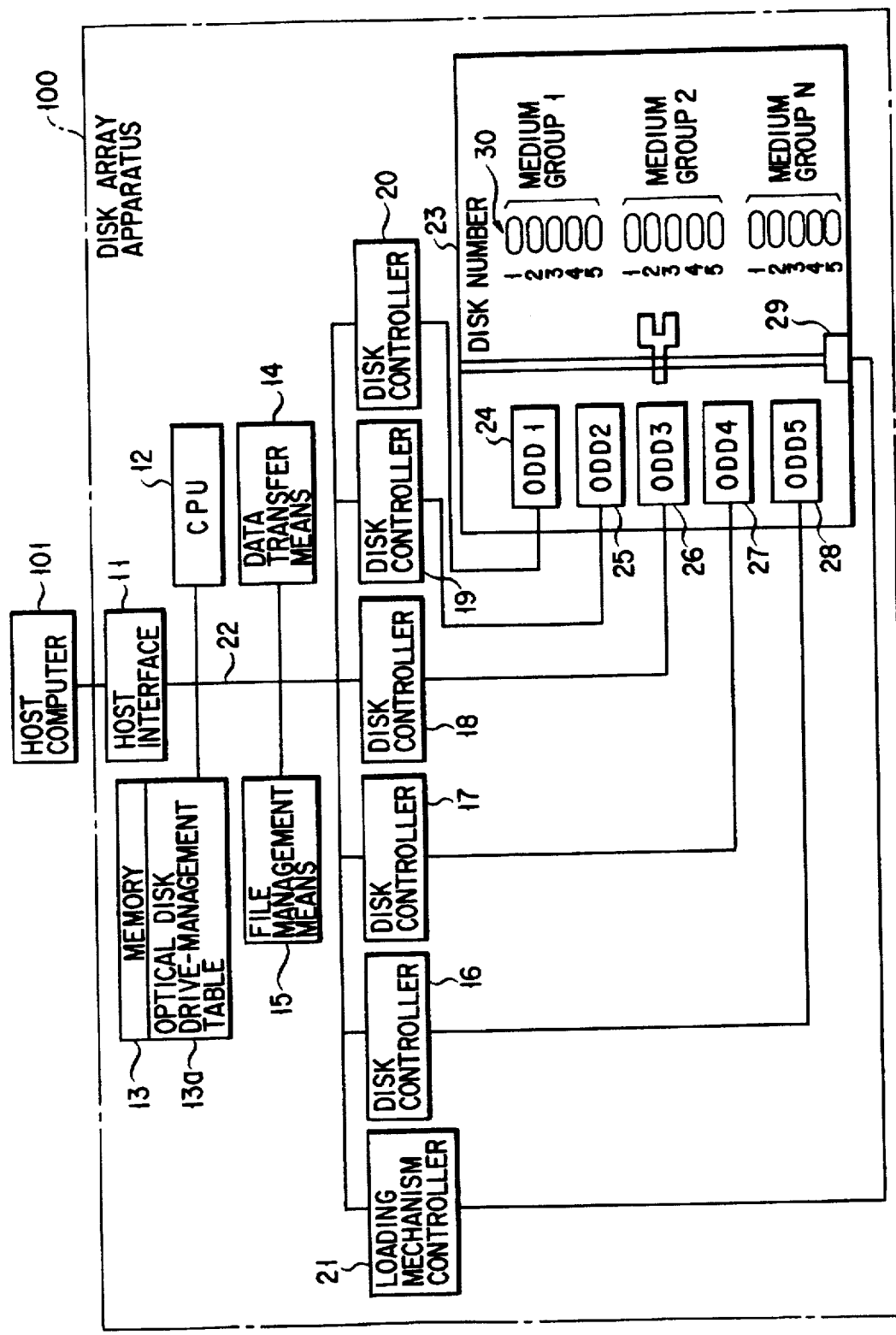
FIG. 3 is a block diagram showing a disk array apparatus according to one embodiment of the present invention.

FIG. 3 is a block diagram showing a disk array apparatus 100 according to one embodiment of the present invention.

The disk array apparatus comprises: a host interface 11 for performing interface control with reference to a host computer 101; CPU 12 for controlling the entire disk array apparatus 100; a memory 13 for temporarily storing the program codes or data of CPU 2, the communication data exchanged with reference to the host apparatus 101, and the data to be stored in optical disks; file management means 15 for managing the files stored in the disk array apparatus 100; data transfer means 14 for transferring data between five optical disk drives 24 . . . 28 and the memory 13 and between the memory 13 and the host computer 101; an optical disk library apparatus 23 which incorporates disk controllers 16–20 for controlling the optical disk drives 24 . . . 28; and five optical disk drives 24–28; and a loading mechanism controller 21 for controlling a loading mechanism 29 provided in the optical disk library apparatus 23.

The CPU 12, host interface 11, memory 13, data transfer means 14, file management means 15, disk controllers 16–20 and loading mechanism controller 21 are connected together by means of a bus 22.

An optical disk drive-management table 13a is stored in the memory 13. As is shown in FIG. 4, the table 13a includes data on medium group numbers and medium numbers of optical disks 30, and the medium group numbers and medium numbers are associated with the drive numbers of optical disk drives 24, . . . 28.

The drive number of optical disk drive 24 is "1", that of optical disk drive 25 is "2", that of optical disk drive 26 is "3", that of optical disk drive 27 is "4", and that of optical disk drive 28 is "5".

In the case shown in FIG. 4, the optical disk 30 having a medium group number of "1" and a medium number "1" is loaded in the optical disk drive of drive number "1", the optical disk 30 having a medium group number of "1" and a medium number "2" is loaded in the optical disk drive of drive number "2", the optical disk 30 having a medium group number of "1" and a medium number "3" is loaded in the optical disk drive of drive number "3", the optical disk 30 having a medium group number of "1" and a medium number "4" is loaded in the optical disk drive of drive number "4", and the optical disk 30 having a medium group number of "1" and a medium number "5" is loaded in the optical disk drive of drive number "5".

The optical disk library apparatus 23 is made up of five optical disk drives 24–28, a loading mechanism 29, and optical disks 30 which are grouped such that the number of disks of each group is five.

In the present embodiment, four of the five optical disks 30, . . . of each group are used as data storage disks, and the remaining one optical disk 30 is used as a parity data storage disk 30.

Cartridge A containing an optical disk 30 therein is inserted into the optical disk drive 24 (25 . . . 28) or removed therefrom.

Figure 5A:
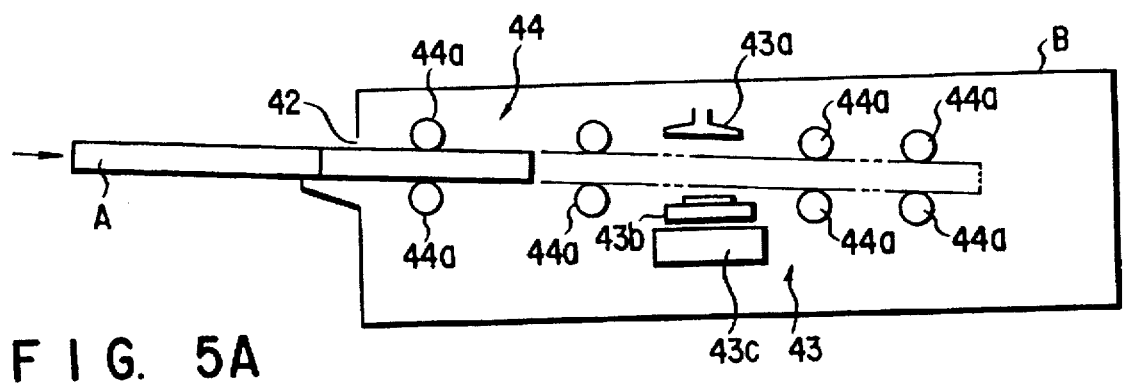
FIGS. 5A-5C are sectional views showing the structures of the optical disk drives.
Figure 5B:
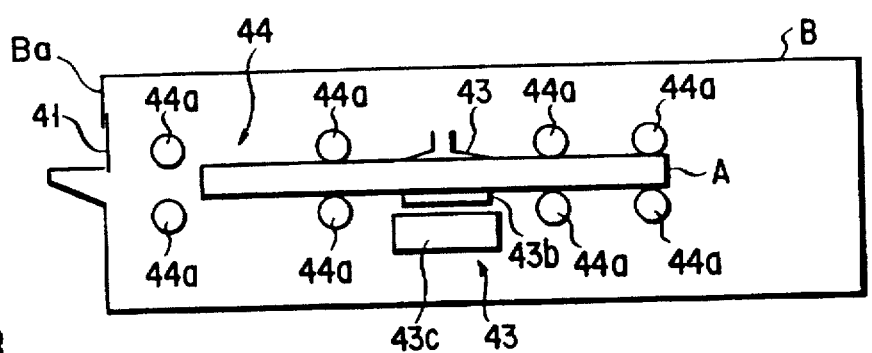
Figure 5C:
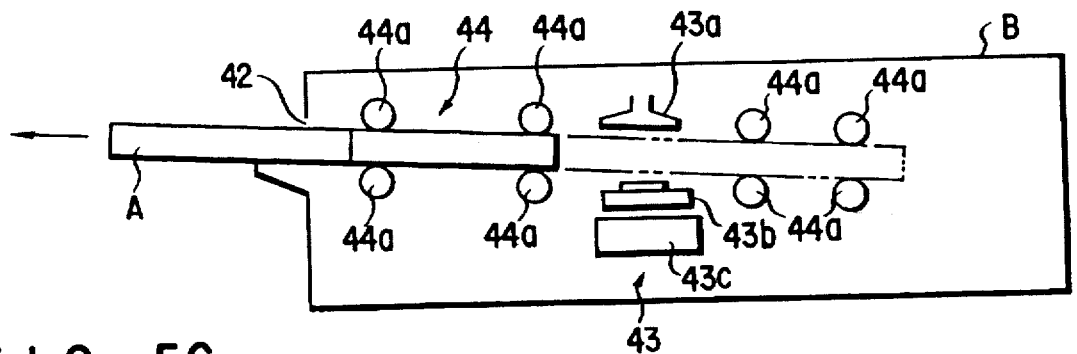

As is shown in FIGS. 5A–5C, the optical disk drive 24 (25, . . . 28) comprises a housing B, and a cartridge insertion port 42, which can be opened or closed by means of a shutter 41, is formed in the front portion Ba of that housing B. An information processing unit (not shown) comprising a drive base mechanism 43 and a loading mechanism 44, is provided inside the housing B. A control circuit board (not shown) for driving the drive base mechanism 43 and loading mechanism 44 is also provided inside the housing B. The loading mechanism 44 is made up of a number of conveyance rollers 44a, . . . and the drive base mechanism 43 is made up of a clamper 43a, a turntable 43b, and a motor 43c.

As is shown in FIG. 5A, the cartridge A inserted through the cartridge insertion port 42 is conveyed by means of the conveyance rollers 44a . . . , inserted into the housing B, and set in a horizontal state. As is shown in FIG. 5B, the cartridge A is then clamped by the clamper 43a and placed at the disk clamp position of the turntable 43b located above the motor 43c.

As a result, the optical disk 30 contained in the cartridge A is held at the position where the optical disk 30 can be irradiated with a laser beam emitted from an optical head (not shown), i.e., a laser beam emitting means.

As is shown in FIG. 5C, the cartridge A is conveyed in the reverse direction by means of the conveyance rollers 44a and discharged from the housing B through the cartridge insertion port 42.

A description will now be Given of the file management means 15.

FIG. 6 is a block diagram showing the internal structure of the file management means 15. As is shown, the file management means 15 comprises: an interface 51 which performs interface control with reference to the bus 22 and enables communication with CPU 12; sub-CPU 52 for controlling the entire file management means; a memory 53 for storing program data, a file management table 53a, etc.; a timer 56 for measuring time intervals; a disk controller 54 for controlling a hard disk drive; and a hard disk drive (hereinafter referred to simply as "HDD") 55 for storing file management information.

When the host apparatus makes a request for file access, the information on the related file is stored in the memory 13. CPU 12 informs the file management means 15 of this state; to be more specific, CPU 12 informs sub-CPU 52 of the state by way of interface 51. In response, sub-CPU 52 receives the file information from the memory 3, and starts retrieval, referring to the file management table 53a cached in the memory 53. The file management table 53a is shown in FIG. 7.

As is shown in FIG. 7, the file management table 53a is made up of: a file number indicating the serial number of a file; a file name; a file amount (size); a medium group number indicating a medium group constituted by five optical disks 30, . . . ; a medium number representing in which one of the five optical disks 30 data is recorded; an initial block address representing the initial block from which the data is recorded; copy information representing whether or not a file copy exists; NEXT information representing whether or not a file is divided; and access frequency information representing how many times a file is accessed within a predetermined length of time (one day or one week).

In the case where one file is stored in one optical disk 30 without being distributed, the medium number is one of "1" to "5". On the other hand, in the case where one file is stored in a distributed manner, the medium number is "−1". In this case, the file is distributively stored in the four optical disks 30 . . . of the same medium group such that the distributed file portions are stored in the mutually corresponding blocks of the optical disks and the amount of the file portion stored in one optical disk is equal to that of the file portion stored in another.

In the case where the copy information is "−1", this indicates that no file copy exists. In the case where the copy information is a positive integer, this indicates that a file copy exists, and the file number of the file copy is indicated by the positive integer. The NEXT information is "−1" when the file is stored in consecutive areas of an optical disk, and is a number representing the next file number when the file is stored discretely.

FIG. 8 shows how files are stored in the optical disks 30 . . . which belong to media group 1 and have medium numbers "1" to "5".

In the optical disk 30 of medium number "1", Text1 having a size of 64 KB is stored from the area of address 80H, distributed data 2-1 which is part of File 2 and has a size of 16 KB is stored from the area of address 180H, and distributed data 1-1, 1-5, 1-9, 1-13, 1-17, 1-21, 1-25 and 1-29 which are parts of Image1 and each of which has a amount of 64 KB are stored from the area of address 200H to the area of address 400H.

In the optical disk 30 of medium number "2", Text2 having a size of 128 KB is stored from the area of address 80H, distributed data 2-2 which is part of File 2 and has a size of 16 KB is stored from the area of address 180H, and distributed data 1-2, 1-6, 1-10, 1-14, 1-18, 1-22, 1-26 and 1-30 which are parts of Image1 and each of which has a size of 64 KB are stored from the area of address 200H to the area of address 400H.

In the optical disk 30 of medium number "3", File2 having a size of 256 KB is stored from the area of address 80H, distributed data 2-3 which is part of File 2 and has a size of 16 KB is stored from the area of address 180H, and distributed data 1-3, 1-7, 1-11, 1-15, 1-19, 1-23, 1-27 and 1-31 which are parts of Image1 and each of which has a size of 64 KB are stored from the area of address 200H to the area of address 400H.

In the optical disk 30 of medium number "4", File1 having a size of 256 KB is stored from the area of address 80H, distributed data 2-4 which is part of File 2 and has a amount of 16 KB is stored from the area of address 180H, distributed data 1-4, 1-8, 1-12, 1-16, 1-20, 1-24, 1-28 and 1-32 which are parts of Image1 and each of which has a size of 64 KB are stored from the area of address 200H to the area of address 400H, and Text5 having a size of 64 KB is stored from the area of address 480H.

In the optical disk 30 of medium number "5", parity data related to the data of the corresponding addresses of the optical disks 30 of medium numbers "1" to "4" is stored.

A description will now be given of the comparison means which compares the data size of a file with a threshold value.

The memory 53 of the file management means 15 stores a data size threshold value. This threshold value can be changed by the user since the optimal threshold value is dependent on the system or the purpose for which the system is used.

To change the data size threshold value, the user enters a threshold value-changing command and a new threshold value by operating the host apparatus 101. The command and the new threshold value are supplied from the host apparatus 101 to the disk array apparatus 100 through the host interface 11. Upon receipt of the command, CPU 12 supplies the new threshold value to the file management means 15, and sub-CPU 52 replaces the threshold value stored in the memory 53 with the new threshold value.

When the data size threshold value is changed, the data stored in HDD 55 is also updated. When the system is turned on, the threshold value is loaded in the memory 53, and when data is written thereafter, sub-CPU 52 compares the data amount supplied from the host apparatus 101 with the threshold value loaded in the memory 53.

When the data amount is smaller than the threshold value, the data is stored in one optical disk without being distributed. On the other hand, when the data size is larger than the threshold value, the medium number is set to be "−1", and CPU 12 is informed of this medium number, for distributive data recording.

Figures 9, 10, 11:
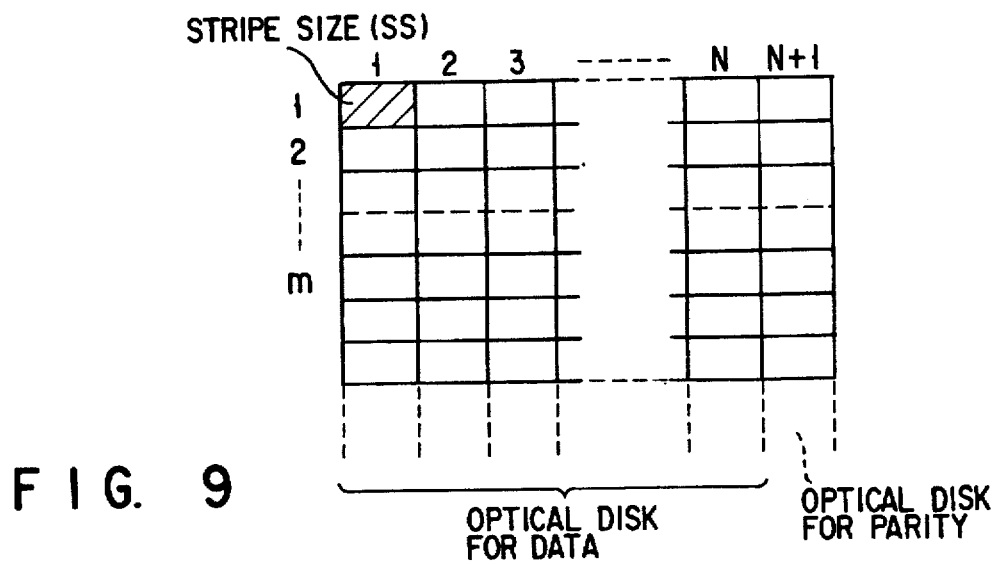
FIG. 9 shows how a data amount is compared with its threshold value according to the present invention.
FIG. 10 shows how files are stored in optical disks.
FIG. 11 shows how disks are replaced with others when the disks are accessed according to the present invention.

FIG. 9 shows an example of a manner in which the data amount threshold value is determined. In the case shown in FIG. 9, the threshold value is determined by:

$$(\text{Threshold Value}) = SS \times N \times m$$

where "SS" is a distributive storage amount (KB) used as a unit based on which data is distributed among the optical disks 30 .... "N" is the number of disks among which the data is distributed, and "m" is an integer.

The value of "m" is determined such that the threshold value becomes larger than the average data amount. In the case where SS=64 KB, N=4 and (average data size)=300 KB, the value of "m" is determined as "2" or greater. When "m"="2", the threshold value is 512 KB.

A file having a large data amount is distributively stored in optical disks on the basis of the threshold value determined as above. Since the distributed file portions can be accessed in parallel and data can be transferred at one time by means of four optical disk drives, high-speed access is enabled.

Since a file having a small data size is not distributively stored, a number of files of small data size can be accessed in parallel. Therefore, when the disk array apparatus is incorporated in a network system and files have to be accessed at random, the response time can be as short as possible.

As described above, the disk array apparatus determines whether one file should be concentratedly stored in a single optical disk or distributively stored in a number of optical disks in accordance with the size of that file, so as to ensure high-speed access.

A description will now be given as to how the access frequency is controlled.

The file management means 15 counts the number of times a file is accessed and updates the access frequency information of the file management table 53a. Since the access frequency must be measured within a predetermined length of time (one day or one week), sub-CPU 52 resets the access frequency information of the file management table 53a at the predetermined time intervals measured by the timer 56.

When there is a file which is accessed frequently, i.e., a file whose access frequency information is "10" or more, the file is divided for enabling parallel access. Alternatively, a copy of the file is made and stored in another optical disk 30. As long as this optical disk 30 is set in the optical disk drive 24, the file can be accessed even if the optical disk 30 bearing the original file is not set in the optical disk drive 24.

Of the files shown in FIG. 7, "File2", the file number of which is "11", is accessed very often. In order to permit "File2" to be accessed in parallel, it is distributively stored in four optical disks 30. It should be noted that "File2" is stored in a single optical disk 30, with a file number of "10", when it is recorded for the first time.

Although "File2" is initially recorded in a single optical disk 30, it turns out afterwards that "File2" is accessed very often. Therefore, sub-CPU 52 makes a request that "File2" be distributively stored in the optical disks of medium Group 1, from the blocks whose address is 180H, and sends the request to CPU 12. Upon receipt of this request, CPU 12 causes the optical disk drive 26 to read out the data of "File2" from the optical disk of medium number "3", and supplies the readout data to the memory 13 by way of the disk controller 8 and the data transfer means 14.

In the memory 13, the data is divided into four pieces of data, and these four pieces of data are written in the optical disks 30 of medium numbers "1" to "4" by means of the data transfer means 14 and the disk controllers 20, 19, 18 and 17. At the time, CPU 12 calculates parity data on the basis of the four pieces of data and stores the parity data in the memory 13. The parity data is supplied to the optical disk drive 28 by way of the disk controller 16 and is written in the corresponding blocks of the optical disk 30 which belongs to medium group "1" and has medium number "5". The parity data is calculated by the following formula (1):

$$(\text{File2-}P) = (\text{File2-1}) \oplus (\text{File2-2}) \oplus (\text{File2-3}) \oplus (\text{File 2-4}) \quad (1)$$

where $\oplus$ represents an exclusive OR.

Like the data amount threshold value described above, an access frequency threshold value is loaded in the memory 53 when the system is turned on. The access frequency threshold value in the memory 53 is compared with the access frequency information of the file management table 53a. When the value of the access frequency information is smaller than the threshold value, the corresponding file is stored in a single optical disk 30. On the other hand, when that value is larger than the threshold value, the corresponding file is distributively stored among a number of optical disks 30.

Like the file amount threshold value, the access frequency threshold value can be changed by the user, and the user enters a threshold value-changing command and a new threshold value by operating the host apparatus 101. The access frequency threshold value is determined, for example, by the following formula:

$$(\text{Threshold Value}) = T \otimes u = P/Q \otimes u$$

where "P" is the total number of times data access is performed within a unit time, "Q" is the number of data files accessed, "T" is an average number of times the data access is performed with respect to the accessed files, and "u" is an integer.

In the case where T=2.5 and u=4, the access frequency threshold value is 10. That is, data which is accessed ten times or more within the unit time, the corresponding file is distributively stored among optical disks 30.

Next, a description will be given of a file which is accessed very often and a copy of which is made. File "Text5" having a file number of "6" is accessed very often, and its copy is made and stored with a file number of "7". Sub-CPU 52 checks how many times files are accessed within the predetermined length of time measured by the timer 56, and determines that file "Text5" is accessed very often. For this file, therefore, sub-CPU 52 secures a 64 KB area starting from the block of initial address "400H" in the optical disk 30 belonging to medium group "1" and having medium number "4". Then, sub-CPU 52 requests CPU 12 to copy the 64 KB data which is stored in the optical disk of medium group "1" and medium number "4", from the block of initial address of "480H", into the 64 KB area secured by sub-CPU 52.

Upon receipt of this request, CPU 12 reads the data on "Text5" from the optical disk which belongs to medium group "1" and has medium number "4" and which is loaded in the optical disk drive 27. The read data on "Text5" is supplied to the memory 13 by means of the disk controller 17 and the data transfer means 17, and temporarily stored in the memory 13. Subsequently, CPU 12 reads the data from the memory 13 and writes it in the optical disk which belongs to medium group "1" and has medium number "3" and which is loaded in the optical disk drive 26. The data is written from the block having an initial address of "400H" by means of the data transfer means 14 and the display controller 18.

As described above, a number of copies of the same file can be stored in different optical disks 30. By virtue of this feature, the following advantage is obtained.

Let it be assumed that file "Text5" must be accessed when, as shown in FIGS. 10 and 11, the optical disk 30 belonging to medium group "1" and having medium number "5" is replaced with the corresponding optical disk of medium group "2", for the accessing of file "Text3". In this case, sub-CPU 52 informs CPU 2 that a copy file of "Text5" is present in the optical disk 30 belonging to medium group "1" and having medium number "3". Therefore, CPU 2 can access the copy file of this disk, without replacing the optical disk 30 belonging to medium group "1" and having medium number "5".

The access frequency can be managed not only for each file but also for each optical disk 30, and a file which is not often accessed can be copied into an optical disk 30 which is often accessed. Even when the optical disk 30 which is not often accessed must be accessed and replaced with another, the access can be performed with no need for replacement since the optical disk 30 contains the file which is often accessed. In the case where the access frequency is managed for each optical disk 30, the management may be performed on the basis of the access frequency, medium group and medium number of the file management table 53a. Alternatively, the file management means 15 may prepare access frequency tables used exclusively for the respective optical disks 30.

A description will now be given of the outline of the operation of the disk array apparatus 100 described above.

When file data is to be written, the information regarding the file name and data amount is supplied from the host apparatus 101 to the disk array apparatus 100 by way of the host interface 11. In the disk array apparatus 100, the information is written in the memory 13.

The file data is supplied from the host apparatus 101 to the memory 13 of the disk array apparatus 100 by way of the data transfer means 14, and is temporarily stored in the memory 13.

CPU 12 informs the file management means 15 of the information regarding the file name and data amount, and the file management means 15 determines whether the file represented by the information is a new file or a previously-created file, by referring to the file management table 53a.

When the file represented by the information is a new file, it is registered in the file management table 53a. Then, the medium group which the optical disk or disks 30 ... to be used for storing the file belong to and the address of the area or areas in which the file is to be stored, are determined. CPU 12 is notified of the results of this determination.

In response to the results of the determination, CPU 12 controls the optical disk library apparatus 23 such that one or five optical disks 30 to be used for storing the file are loaded in one or five optical disk drives (24, or 24–28). Thereafter, the file data temporarily stored in the memory 13 is written in the optical disk or disks 30 by means of the data transfer means 14 and the optical disk drive or drives (24, 24–28).

On the other hand, when the file is a previously-created file and is to be updated, the information regarding the optical disk or disks 30 in which the file is stored is read from the file management table 53a, and the optical disk or disks 30 designated by the information are loaded in the optical disk drive (24, or 24–28). Further, those areas of the optical disk or disks 30 which are used for storing the updated file are determined in accordance with the data amount of the updated file.

To read file data, the information regarding the file data is supplied from the host apparatus 101 to the file management means 15, and the file management means 15 examines the file management table 53a on the basis of that information, so as to check which optical disk or disks 30 store the file data.

CPU 12 obtains the information regarding the optical disk or disks 30 and loads the corresponding disk or disks 30 in the optical disk drive or drives (24, or 24–28). The file data is temporarily stored in the memory 13 by means of the disk controllers 16–20 and data transfer means 14.

When the file data has been completely stored in the memory 13, it is supplied to the host apparatus 101 by means of the data transfer means and the host interface 11.

How file data is read will be described more specifically. Let it be assumed that the host apparatus 101 makes a read request for "Text1". In this case, the read request for "Text1" is first set in the memory 13, and then CPU 12 informs sub-CPU 52 of the file management means 15 that a file access request is made by the host apparatus 101.

Sub-CPU 52 accesses the memory 13 and determines that the file access request is a read request for "Text1". Subsequently, sub-CPU 52 searches the file management table 53a cached in the memory 53 for the information on "Text1". When a file name is used for this search, sub-CPU 52 detects that the file number of "Text1" is "1", and on the basis of this detection writes information regarding the optical disk 30 (namely, medium group "1", medium number "1" and initial block address "80H") in the memory 3. Thereafter, sub-CPU 52 notifies CPU 12 of the end of the search.

CPU 12 checks whether or not the optical disk 30 identified by medium group "1" and medium number "1" is loaded in the optical disk drives 24, ... by referring to the optical disk drive-management table 13a (FIG. 4) stored in the memory 13. When that optical disk 30 is loaded in the optical disk drive 24, ..., the disk controllers 16 ... control the optical disk drive 24. Data obtained thereby is supplied to the memory 13, and is further transmitted from the memory 13 to the host apparatus 101 by way of the host interface 11, thus completing the data reading operation.

When reference to the optical disk drive-management table 13a shows that the optical disk 30 is not loaded in the optical disk drives 24, . . . , the loading mechanism controller 21 controls both the loading mechanism 29 of the optical disk library apparatus 23 and the optical disk drives 24, . . . . As a result, the currently-loaded optical disk 30 is removed from the optical disk drives 24 . . . and returned to a storage slot, and the optical disk 30 which stores the requested file is loaded in the optical disk drives 24 . . . . Thereafter, data accessing is executed.

A description will now be given of the case where the host apparatus 101 makes a request for writing the data on new file "Image1".

In this case, the disk array apparatus 100 receives the information representing file name "Image1" and file amount "2 MB" from the host apparatus 101 and stores the information in the memory 13. CPU 12 informs sub-CPU 52 that there is a file write request. Simultaneously, the disk array apparatus 100 receives 2 MB data and supplies it to the memory 13 by way of the host interface 11 and the data transfer means 14. The 2 MB data is temporarily stored in the memory 13.

In the file management means 15, sub-CPU 52 receives the information on "Image1" from the memory 13 and registers this information in the file management table 53a.

Since the "Image1" has a file amount as large as 2 MB, sub-CPU 52 determines that the "Image1" must be distributively stored for enabling parallel accessing, and assigns file number "3", medium group "1" and medium number "−1" to the "Image1".

Those blocks of optical disks 30 . . . which have the same addresses are used for storing the "Image1", and "200H" is determined as the initial address. That is, the "Image1" is distributively stored in the optical disks 30, . . . of medium group "1" and medium numbers "1" to "4" such that each of these optical disks 30, . . . stores 64 KB data. The first 64 KB file data is stored in the optical disk 30 of medium group "1" and medium number "1", from the block having an address of "200H".

The second 64 KB file data is stored in the optical disk 30 of medium group "1" and medium number "2", from the block having an address of "200H", and the third 64 KB file data is stored in the optical disk 30 of medium group "1" and medium number "3", from the block having an address of "200H".

The fourth 64 KB file data is stored in the optical disk 30 of medium group "1" and medium number "4", from the block having an address of "200H", and the fifth 64 KB file data is stored in the optical disk 30 of medium group "1" and medium number "1", from the block having an address of "240H".

CPU 12 prepares data to be stored in each of the optical disks 30, . . . , by dividing the "Image1". These distributive data are prepared in the memory 13. In addition, CPU 12 prepares parity data to be stored in the optical disk 30 of medium number "5".

After the distributive data and the parity data are prepared in the memory 13, they are supplied from the memory 13 to the disk controllers 16-20 by means of the 5-channel DMAC (direct memory access controller) of the data transfer means 14. The distributive data and the parity data are written in the designated-address areas of the optical disks 30, . . . . It should be noted that in this embodiment, one block of each optical disk 30 is a 1 KB area.

In order to write data in the above manner, the present embodiment employs RAID4. However, RAID5 or RAID3 may be employed, in place of RAID4. Where RAID5 is employed, the optical disk 30 for storing parity data need not be fixed. Where RAID3 is employed, data is distributively stored in optical disks 30 . . . in units of one byte.

As described above, the file management means 15 determines whether or not a file should be distributively stored, on the basis of the amount of that file.

A description will now be given of the case of a file which is often accessed and has a duplicate copy in an optical disk different from that in which the original file is stored.

File "Text5", the file number of which is "6", is accessed very often, and a duplicate copy of "Text5" is made, with a file number of "7" attached. To be more specific, sub-CPU 52 checks how many times files are accessed within the predetermined length of time measured by the timer 56, and determines that file "Text5" is accessed very often. For this file, therefore, sub-CPU 52 secures a 64 KB area starting from the block of initial address "400H" in the optical disk 30 having medium number "3".

Then, sub-CPU 52 requests CPU 12 to copy the 64 KB data which is stored in the optical disk 30 of medium group "1" and medium number "3", from the block of initial address of "480H", into the 64 KB area secured by sub-CPU 52.

Upon receipt of this request, CPU 12 reads the data on "Text5" from the optical disk 30 which belongs to medium group "1" and has medium number "4" and which is loaded in the optical disk drive 27. The read data on "Text5" is supplied to the memory 13 by means of the disk controller 17 and the data transfer means 17, and temporarily stored in the memory 13. Subsequently, CPU 12 reads the data from the memory 13 and writes it in the optical disk 30 which belongs to medium group "1" and has medium number "3" and which is loaded in the optical disk drive 26. The data is written from the block having an initial address of "400H" by means of the data transfer means 14 and the display controller 18.

Figure 12B:
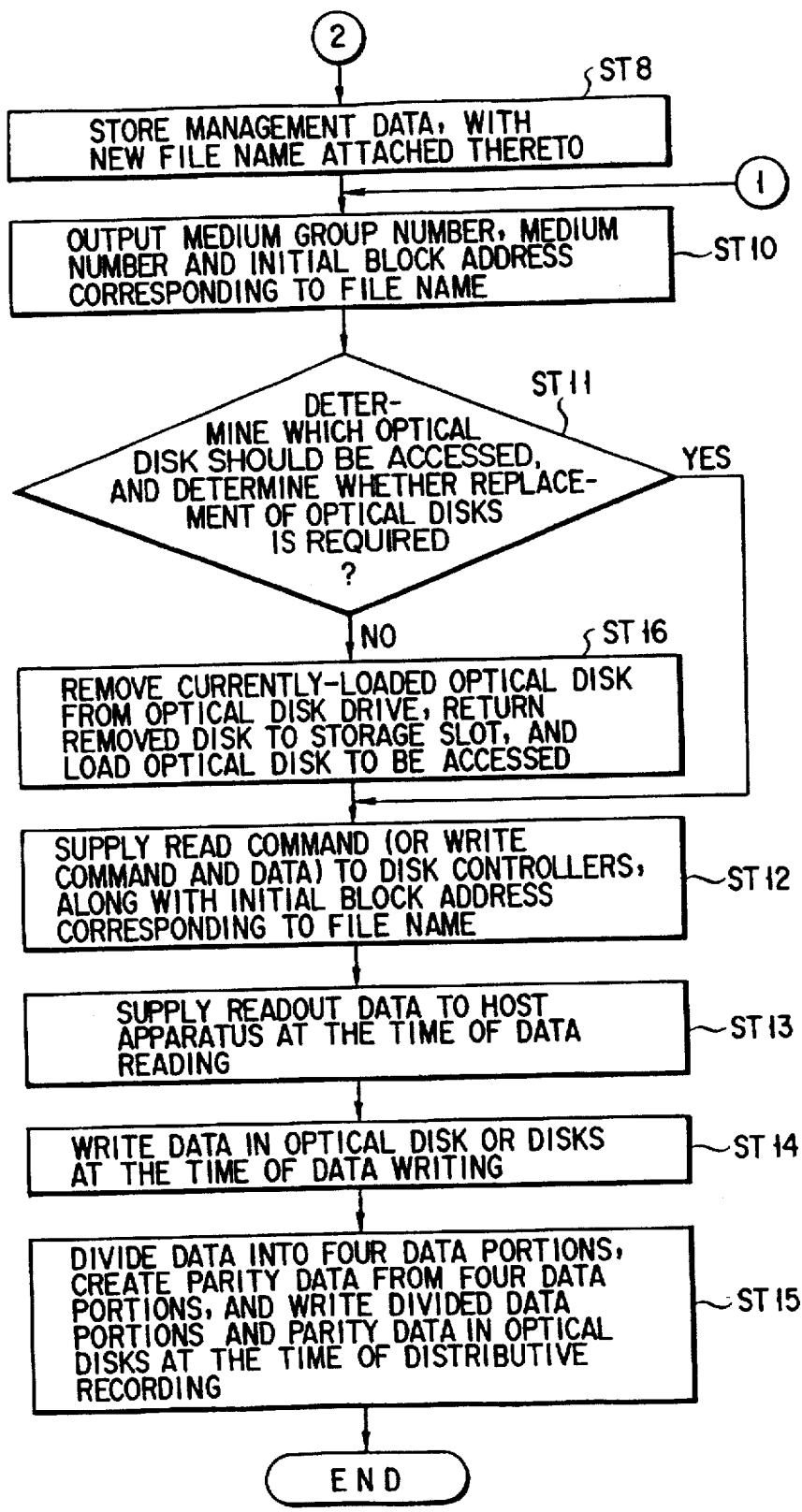

The operation of the subject disk array apparatus will be described, referring to the flowchart shown in FIG. 12A and 12B.

First of all, CPU 12 receives an access request for file data (i.e., a read/write command, a file name, a file data amount, file data, etc.) at the host interface 11 thereof (ST1), and stores the access request in the memory 13. By way of the bus 22, CPU 12 informs sub-CPU 52 of the file management means 15 that the access request has been made (ST2). Then, sub-CPU 52 reads from the memory the name of the file which is to be accessed, and searches a file name corresponding to the read file name (ST3). If a file name corresponding to the read file name is not found (ST4), sub-CPU 52 determines whether the access request read from the memory 13 is a request for read access or a request for write access (ST5). If the access request is a request for read access, sub-CPU 52 determines that an error has occurred and informs CPU 12 of the occurrence of the error (ST6). In response to the error message from sub-CPU 52, CPU 12 informs the host apparatus that the access request is an error, and terminates the processing (ST7).

If the access request is a request for write access, sub-CPU 52 attaches a new file number to the data to be written, and stores management data in the file management table 53a, using the new file name (ST8).

How management data is stored in the file management table 53a will be described with reference to the flowchart shown in FIG. 13.

First of all, CPU 52 reads out the file name and file amount from the memory 13, and stores them in the "new file number" portion of the file management table 53a (ST21).

Then, sub-CPU 52 checks whether the file amount read out from the memory 13 is larger or smaller than the predetermined file amount (e.g., 1 MB) (ST22). When the file size read out from the memory 13 is larger than the predetermined file amount, sub-CPU 52 determines that the file data must be distributively stored (ST23). In this case, sub-CPU 52 stores the following information in the "new file number" portion of the file management table 53a: the medium group number of the optical disks in which the file data is to be distributively stored; a medium number of "−1"; an initial block address; copy information of "−1"; NEXT information of "−1"; and an access frequency of "1" (ST24).

The medium group representing the optical disks used for distributive storage, and the initial block address representing the areas from which data is to be recorded are managed by the data stored in another area of the memory 53.

When it is determined in step ST22 that the file amount read out from the memory 13 is smaller than the predetermined file amount, sub-CPU 52 determines that the file data should be concentratedly stored (ST25). In this case, sub-CPU 52 stores the following information in the "new file number" portion of the file management table 53a: the medium group number and the medium number which designate the optical disk used for storing the file data; an initial block address; copy information of "−1"; NEXT information of "−1"; and an access frequency of "1" (ST26).

The medium group and the medium number which designate the optical disk used for concentrated storage and the initial block address from which the file data is stored, are managed by the data stored in another area of the memory 53.

In the case where the file data is distributively stored, new file numbers are assigned to the respective portions of the file data, and the management data for each of these file data portions is stored in the file management table 53a. To each file data portion that continues to another file data portion, a file number for identifying the file storing the next file data portion is assigned as NEXT information.

In the case where a file name corresponding to the read fine name is found in step ST4 shown in FIG. 12, sub-CPU 52 adds "1" to the value of the access frequency (ST9). After this access frequency updating or after the management data is stored in the file management table 53a in step ST8, sub-CPU 52 supplies CPU 12 with information regarding the medium group number, medium number and initial block address corresponding to the file name (ST10).

CPU 12 determines which optical disk 30 should be accessed, on the basis of the medium group number and the medium number. Further, CPU 12 checks which optical disks 30, . . . are loaded in the optical disk drives 24, . . . , on the basis of the storage contents of the optical disk drive-management table 13a, and determines whether the optical disk 30 to be accessed has to be loaded in the optical disk drive 24 (ST11).

In the case where file "Text1" is to be accessed, CPU 12 is supplied with the information on medium group number "1" and medium number "1". If, in this case, the storage contents shown in FIG. 4 are stored in the optical disk drive-management table 13a, CPU 12 determines that the optical disk 30 belonging to medium group number "1" and having medium number "1" is loaded in the optical disk drive 24. Therefore, CPU 12 determines that another optical disk 30 need not be loaded in the optical disk drives 24.

In the case where "Text1" is to be accessed, CPU 12 is supplied with the information on medium group number "1" and medium number "−1". If, in this case, the storage contents shown in FIG. 4 are stored in the optical disk drive-management table 13a, CPU 12 determines that the optical disks 30, . . . belonging to medium group number "1" and having medium numbers "1" to "5" are loaded in the optical disk drives 24 . . . . Therefore, CPU 12 determines that another optical disk 30 need not be loaded in the optical disk drives 24, . . . .

In the case where file "Image2" is to be accessed, CPU 12 is supplied with the information on medium group number "2" and medium number "1". If, in this case, the storage contents shown in FIG. 4 are stored in the optical disk drive-management table 13a, CPU 12 determines that the optical disk 30 belonging to medium group number "2" and having medium number "2" is not loaded in the optical disk drive 24. Therefore, CPU 12 determines that the optical disk 30 to be accessed has to be loaded in the optical disk drive 24.

When it is determined in step ST11 that the optical disk or disks 30 . . . to be accessed need not be loaded in the optical disk drive or drives 24, . . . . CPU 12 supplies a read command (or a write command and data to be written) to the disk controllers 16 . . . corresponding to the optical disk drives 24, . . . in which the optical disks 30 are loaded. CPU 12 also supplies the initial block address corresponding to the file name to the disk controllers 16, . . . (ST12).

When data is read out, the disk controllers 16, . . . control the corresponding optical disk drives 24, . . . , stores the readout data in the memory 13, and transfers the data from the memory 13 to the host apparatus 101 (ST13).

Where the data to be read out is distributively stored in five optical disks 30 . . . , CPU 12 combines the data portions read out from the optical disks 30, together, and the file data obtained thereby is supplied to the host apparatus 101.

When data is written, the disk controllers 16, . . . control the corresponding optical disk drives 24 . . . , so as to write the data in the optical disk 30 (ST14).

Where the data to be written should be distributively stored in five optical disks 30 . . . , CPU 12 divides the data from the host apparatus 101 into four data portions, creates parity data from the four data portions, and controls the optical disk drives 24, . . . to write the divided data portions and the parity data in the optical disks 30 . . . (ST15).

When it is determined in step ST11 that the optical disk or disks 30 . . . to be accessed have to be loaded in the optical disk drive or drives 24 . . . , CPU 12 causes the loading mechanism controller 21 to control the loading mechanism 29, such that the currently-loaded optical disk 30 is removed from the optical disk drives 24, . . . and returned to the storage slot, and such that the optical disk 30 to be accessed is loaded in the optical disk drives 24 . . . (ST16).

After this loading processing, the data reading or writing described above is executed (ST12 to ST15).

When CPU 12 is not supplied with a request for accessing file data, it causes sub-CPU 52 to execute access frequency management processing (ST17).

Figure 14:
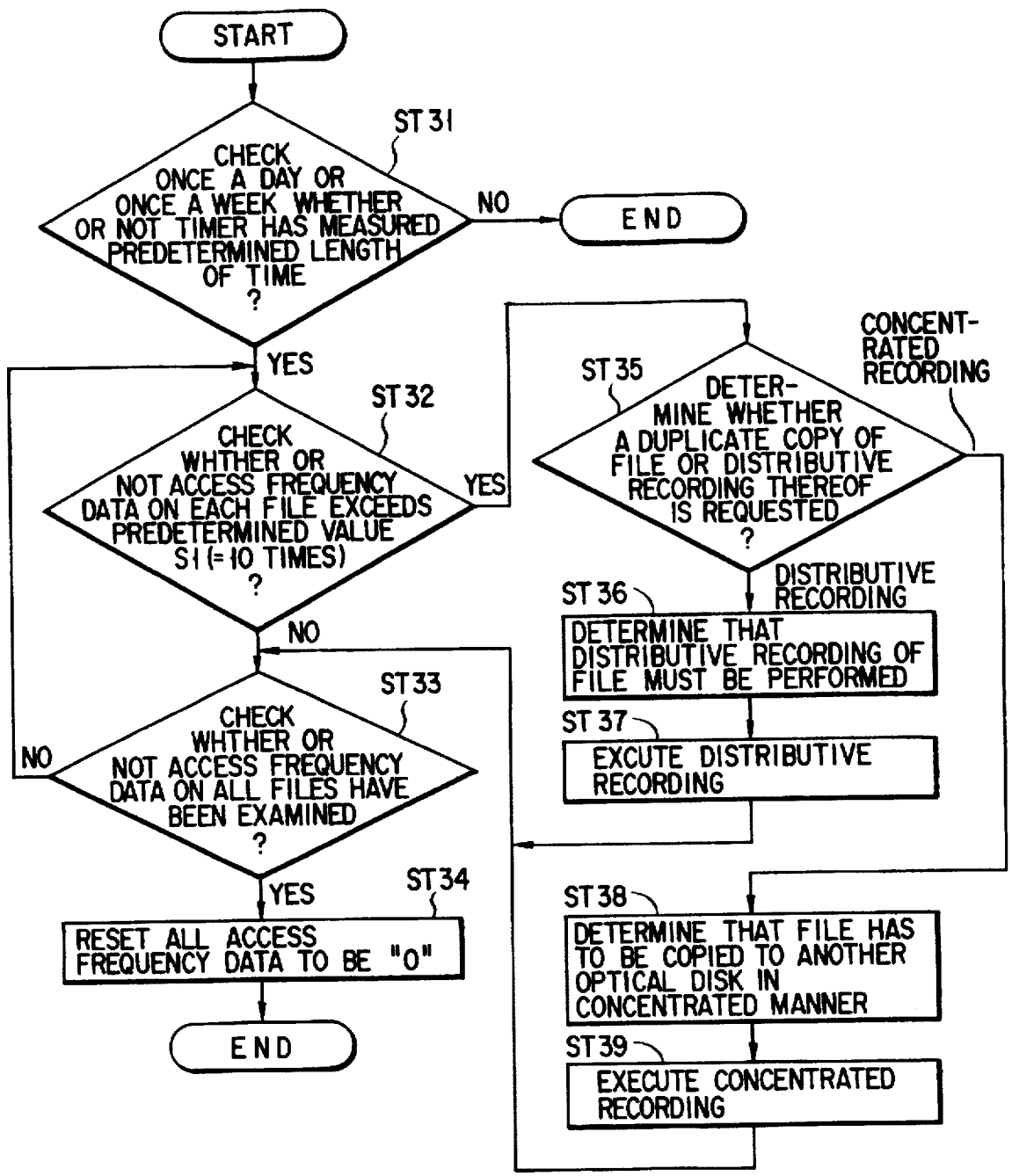
FIG. 14 is also a flowchart showing how individual operations are performed.

This access frequency management processing will be described with reference to the flowchart shown in FIG. 14.

When sub-CPU 52 receives a command for access frequency management processing from CPU 12, sub-CPU 52 checks, once a day or once a week, whether or not the timer 56 has measured the predetermined length of time (ST31). If the timer 56 has not yet measured the predetermined length of time, the access frequency management processing is brought to an end.

If it is determined in step ST31 that the timer 56 has finished measurement of the predetermined time interval, sub-CPU 52 checks whether or not the access frequency data stored in the file management table 53a exceeds the predetermined value S1 (=10 times) in step ST32.

If the access frequency data does not exceed the predetermined value S1, sub-CPU 52 examines whether or not it has checked all access frequency data stored in the file management table 53a (ST33). If all access frequency data have been checked, sub-CPU 52 resets them to be "0" (ST34) and puts the access frequency management processing to an end. If not, the flow returns to step ST32.

If it is determined in step ST32 that the access frequency data of one file exceeds the predetermined value S1, sub-CPU 52 determines in step ST35 whether a duplicate copy of that file or distributive recording thereof is requested.

In the case where the distributive storage of the file is requested in step ST35, sub-CPU 52 determines in step ST36 that the distributive recording of the file must be performed, and executes the distributive recording in step ST37. Thereafter, the flow advances to step ST33.

In the case where the duplicate copy of the file is requested in step ST35, sub-CPU 52 determines in step ST38 that the file has to be copied to another optical disk in a concentrated manner, and executes this concentrated recording in step ST39. The, the flow advances to step ST33.

Whether a duplicate copy of a file should be made or distributive recording of the file is required may be determined in accordance with the amount or access frequency of the file.

The present invention is not limited to the embodiment described above, and can be modified in various manners. For example, recording media other than optical disks may be employed. Although the above embodiment two CPUs (namely, a CPU for controlling the entire disk array apparatus and a sub-CPU for controlling the file management means), all processing operations may be executed by a single CPU. Moreover, although the embodiment was described, referring to the case of RAID4, the present invention is applicable to the case of RAID5, etc. The present invention can be modified in various manners as long as the modifications attain the same functions and advantages as the above embodiment.

In the disk array apparatus described above, the disk drives are of a type capable of distributively storing a file among portable optical disks, but a file is not always stored in a distributive manner. Therefore, if a file to be accessed is stored in an optical disk which is not presently loaded in the disk drives, not all optical disks that are loaded in the disk drives have to be replaced; only one of them has to be replaced. Hence, a high processing speed is ensured. In addition, since the optical disks which are not replaced can be accessed, the processing performance does not much lower. Further, since a file having a large amount is stored in a distributive manner, such a file can be accessed at high speed.

Since an often-accessed file is stored in a distributive manner by the access frequency management, such a file can be accessed at high speed. A duplicate copy of the often-accessed file can be made in another optical disk. Therefore, even if the master disk storing the often-accessed file is removed from the optical disk drive, the duplicate copy can be accessed as long as the optical disk storing the duplicate copy is loaded in any one of the optical disk drives. Since, therefore, the replacement of an optical disk with the master optical disk is not required, the performance of the data access processing is improved as a whole.

The subject disk array apparatus can employ portable recording media. Since it can employ optical disks, it provides a larger storage amount than a disk array apparatus employing hard disks. In addition, the disk array apparatus can be manufactured at low cost.

In the case where the disk array apparatus comprises an optical disk library apparatus, it is easy to additionally employ further optical disks, and the function of the disk array apparatus can be expanded. Therefore, the disk array apparatus is high in operation speed, reliable in operation and large in storage amount.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A disk array apparatus comprising:

a plurality of disk drives each for executing data access to a disk;

management means for preparing a media group including a plurality of disks which are assigned in correspondence to the disk drives;

count means for counting the number of times of the data access with respect to each of the disk drives, said count means operating when the data access is executed by any of the disk drives; and control means, operating when the number of times certain data recorded in a disk is accessed exceeds a predetermined number of times in a predetermined time interval, for dividing the certain data into a plurality of data segments, and for distributively recording the data segments in at least two of disks of the media group prepared by the management means.

2. A disk array apparatus according to claim 1, wherein said control means includes means for recording parity data which is used for recovering the data on one of the disks constituting the media group prepared by the management means.

3. A disk array apparatus according to claim 1, further comprising:

second control means for controlling the disk drives to operate in parallel, so as to enable data to be recorded in a plurality of disks simultaneously.

4. A disk array apparatus according to claim 1, wherein said control means includes means for comparing the number of times of the data access counted by the count means with a threshold value expressed by:

$$P/Q \times u$$

where "P" is the number of times the data access is executed within a unit time, "Q" is the number of data access, and "u" is an integer.

5. A disk array apparatus employing portable disks, said apparatus comprising:

a plurality of disk drives each for recording data in one of the portable disks and for reproducing the data from said one of the portable disks;

management means for preparing a media group including a plurality of disks which are assigned to respective ones of the disk drives;

count means, operating when data is reproduced by one of the disk drives, for counting the number of times said data has been reproduced; and control means, operating when the number of times of data reproduction counted by the count means exceeds a predetermined number of times in a predetermined time interval, for dividing the data into a plurality of data segments and for distributively recording the data segments in at least two of the disks of the media group prepared by the management means.

6. A disk array apparatus according to claim 5, wherein said control means includes means for recording parity data which is used for recovering the data on one of the disks constituting the media group prepared by the management means.

7. A disk array apparatus according to claim 5, further comprising:

second control means for controlling the disk drives to operate in parallel, so as to enable data to be recorded in a plurality of disks simultaneously.

8. A disk array apparatus according to claim 5, wherein said control means includes means for comparing the number of times of the data reproduction counted by the count means with a threshold value expressed by:

$$P/Q \times u$$

where "P" is the number of times the data is reproduced within a unit time, "Q" is the number of data reproduced, and "u" is an integer.

* * * * *